United States Patent [19]

Hart

[11] 4,343,338
[45] Aug. 10, 1982

[54] TIRE COOLING SYSTEM AND METHOD

[75] Inventor: Cullen P. Hart, Peoria, Ill.

[73] Assignee: Caterpillar Tractor Co., Peoria, Ill.

[21] Appl. No.: 277,756

[22] PCT Filed: Feb. 25, 1981

[86] PCT No.: PCT/US81/00241

§ 371 Date: Feb. 25, 1981

§ 102(e) Date: Feb. 25, 1981

[51] Int. Cl.$^3$ .................. B60C 19/06; F28F 1/00
[52] U.S. Cl. .................. 152/153; 152/330 C; 152/417; 152/DIG. 5; 165/41; 301/5 R
[58] Field of Search .......... 152/153, 330 C, 415, 152/417, DIG.5; 141/38; 165/41, 44, 109 R, 186; 301/6 CS, 6 CF, 5 R

[56] References Cited

U.S. PATENT DOCUMENTS

| | | | |
|---|---|---|---|
| 1,038,092 | 9/1912 | Craig | 152/153 |
| 1,049,677 | 1/1913 | Craig | 152/153 |
| 1,049,678 | 1/1913 | Craig | 152/153 |
| 1,780,306 | 5/1928 | Manly et al. | 152/153 |
| 1,956,739 | 5/1934 | Gollert | 152/153 |
| 2,538,563 | 1/1951 | Isham | 152/153 |
| 3,233,707 | 2/1966 | Müller et al. | 301/6 CS |
| 3,276,500 | 10/1966 | Connor | 152/153 |
| 3,414,036 | 12/1968 | Skidmore | 152/153 |
| 3,599,694 | 8/1971 | Bezbatchenko | 152/153 |
| 3,675,699 | 7/1972 | Ocone | 152/153 |
| 3,708,006 | 1/1973 | King | 152/153 |
| 3,867,973 | 2/1975 | Cozzolino et al. | 152/153 |
| 4,140,198 | 2/1979 | Chamberlain | 301/6 CF |
| 4,298,047 | 11/1981 | Bobard | 141/38 |

*Primary Examiner*—Edward C. Kimlin
*Assistant Examiner*—Lois E. Boland
*Attorney, Agent, or Firm*—Richard F. Phillips

[57] ABSTRACT

A tire cooling system (10) for a vehicle having a wheel (12) with a tire (14) mounted on a rim (16). A heat transfer device (22) is positioned in a central cavity (18) defined by said rim (16) and tire (14). A first fluid (20) is contained in said central cavity (18) while a second fluid (25) is circulated through said heat transfer device (22), said second fluid (25) being in fluid isolation from said first fluid (20). Said second fluid (25) is circulated through a rotating wheel seal (28) to a heat exchanger (38) and back to said heat transfer device (22).

Use of an intermediate heat exchanger, such as said heat transfer device (22), permits use of oil as said second fluid (25) permitting leakage from said rotating wheel seals (28) to be contained by and made up from said final drive sump (42). Oil has, of course, a deleterious affect on rubber. Through use of oil in an isolated cooling loop, relatively simple liquid cooling with an external heat exchanger (38) is achieved.

26 Claims, 2 Drawing Figures

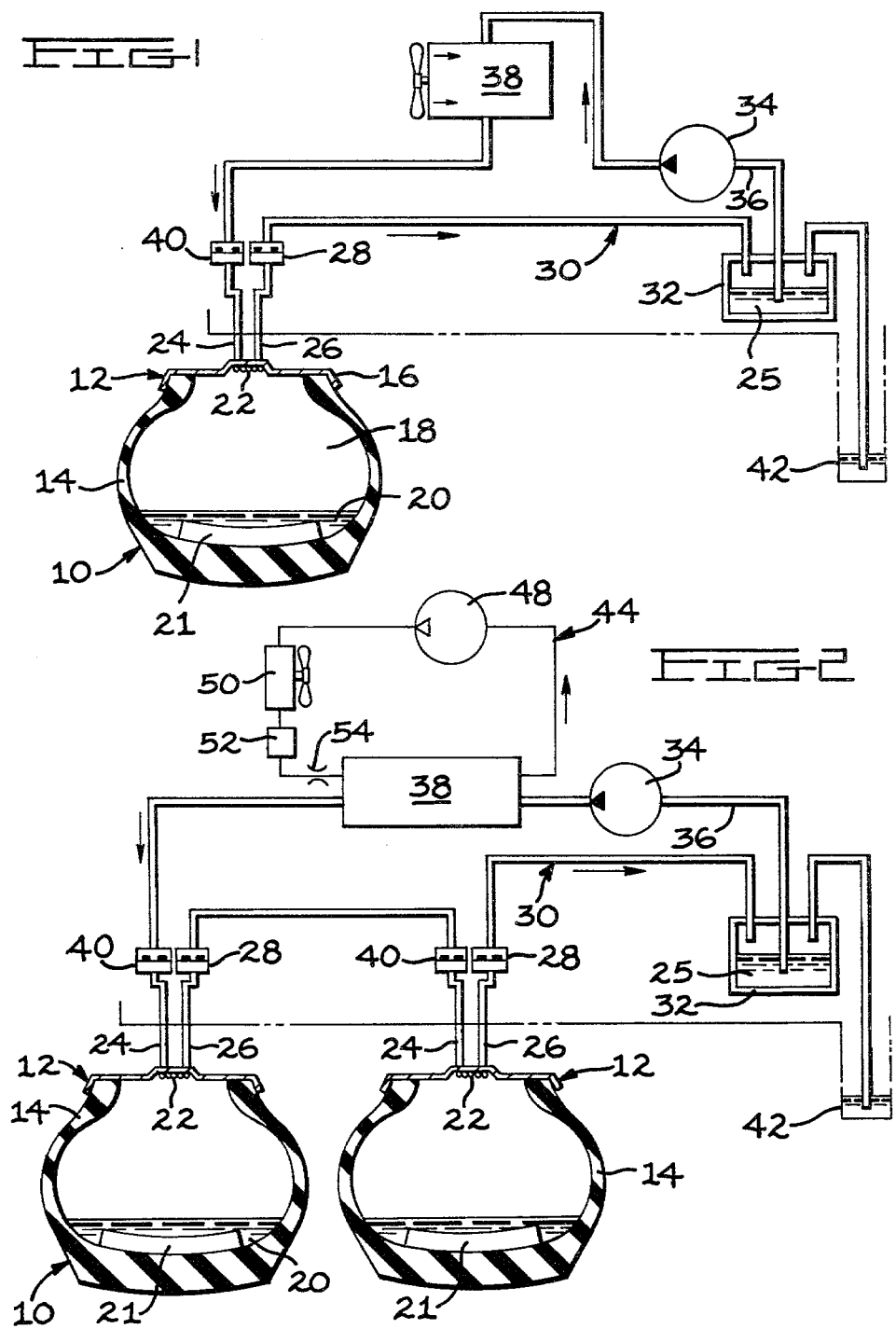

TIRE COOLING SYSTEM AND METHOD

DESCRIPTION

1. Technical Field

This invention relates primarily to systems for cooling tires and more particularly to systems for removing heat from the inside surface and air cavity of beadless, radial and bias ply tires, among others.

2. Background Art

It is well known that the temperatures to which a tire is exposed greatly affect the strength and rate of deterioration of that tire. Generally, the safe load bearing ability of a tire decreases as the temperature of the tire increases. Similarly, exposure of the tire to elevated temperatures, typically in excess of 90° C., for example, decreases the durability of the tire.

For some vehicles, especially heavy off-the-road trucks, tractor scrapers and the like, this temperature sensitivity of the tires often becomes a dominant operating limitation. One measure of this limitation is expressed in terms of ton miles per hour (TMPH), that is, the product of the average load on a tire and the average operating speed of the tire. If the TMPH operating limitation could be improved as by decreasing the operating temperature of the tire, then the speed and/or loading at which the tires could be operated would be proportionately increased.

Heat is generated in a tire primarily in two manners: through compression of the carcass material as it is compressed; and, through hysteresis losses as the rubber carcass material flexes. It is obvious, then, that the rate at which heat is generated is directly related to the product of the loading of the tire and the rate at which the tire rotates. While the configuration of the tire and the material from which the tire is composed can be selected to limit the extent and mitigate the effects of heat build-up in a tire, such efforts are not sufficient in many cases to eliminate vehicle limitations due to heat build-up in the vehicle's tires.

Beginning with the early part of this century, many schemes have been proposed for cooling tires. One class of these tire cooling schemes centers on transferring heat from the hottest portions of the tires to the coolest. For example, in one such design, a volatile liquid is contained within the recess defined by the tire and rim. As this liquid heats it boils and condenses on the coolest portions of the inner recess, thereby effecting a transference of heat. Typical is U.S. Pat. No. 3,675,699 issued to Ocone on July 11, 1972. Such designs have proven not truly effective in that, in many cases, an insufficient amount of additional heat can be transferred from the tire to effect a significant decrease in the highest temperatures within the tire.

Another class of proposals for tire cooling systems involve some form of a reservoir external to the tire with a cooling fluid such as a gas pumped between the reservoir and the central cavity of the tire. Such systems serve to transfer heat away from the tire altogether rather than merely to transfer heat from warmer to cooler portions of the tire. This achieves a greater transference of heat than the totally internal system but is disadvantageous in that, unless the entire system is attached to the wheel for rotation therewith, there is a need for a rotating wheel seal for transferring the cooling medium from the rotating wheel to the non-rotating vehicle. Typically, such seals are imperfect, allowing undesirable leakage. The use of rotating wheel seals is very troublesome in this particular application in that the tire and, of course, the cooling medium are pressurized. Leakage from rotating wheel seals under pressure is especially pronounced.

It would be advantageous if a tire cooling system could employ the advantages of a heat exchanger external to the tire yet avoid the necessity of having either a heat exchanger rotatable with the wheel or suffering significant coolant losses.

The present invention is directed to overcoming one or more of the problems set forth above.

DISCLOSURE OF THE INVENTION

A tire cooling system for a vehicle has a tire mounted on a rim, the tire and rim defining a central cavity. The vehicle has a heat exchanger non-rotatively mounted with respect to the vehicle. Means is included for circulating a fluid from said heat exchanger through said central cavity, said fluid being maintained free from fluid communication with said central cavity.

In certain applications, work-induced heat build-up in the tires of a vehicle imposes a limitation upon the operating capacity, in terms of load and/or duration of operation, of the vehicle. This problem can be mitigated or eliminated by cooling the tire. The most effective cooling can be achieved by a system including a heat exchanger external the wheel. In the present invention, this is accomplished as set forth above.

The described embodiment of the present invention is especially advantageous in that the final drive sump of the vehicle serves as the sump for leakage from the rotating wheel seals necessary in pumping a fluid into and out of a rotating wheel. The cooling fluid in this circuit is the same type of oil as is utilized in the final drive system thereby avoiding contamination problems By sealing the cooling circuit from the tire carcass, oil induced deterioration of the carcass is avoided. The use of a cooling circuit sealed from the central cavity of the tire also permits this cooling circuit to be operated at a low pressure thereby minimizing leakage from the necessary rotating wheel seals.

BRIEF DESCRIPTION OF THE DRAWINGS

FIG. 1 is a schematic of an embodiment of the present invention; and

FIG. 2 is a schematic of a second embodiment of the present invention.

BEST MODE FOR CARRYING OUT THE INVENTION

Referring to the drawings, a tire cooling system embodying the principles of the present invention is generally indicated by the reference numeral 10. The present invention is intended for wheels 12 which have, as is shown in the figures, a tire 14 mounted on a rim 16 with the tire 14 and rim 16 defining a central cavity 18.

Contained by this cavity 18 is a first fluid 20 for absorbing heat from the tire 14. This first fluid 20 is preferably a liquid such as an even mixture of ethylene glycol and water. Other fluids, including gases, may be used. It is preferable that the fluid selected have advantageous heat transfer characteristics and have no deleterious affect on the material from which the tire 14 is composed.

If the first fluid 20 is a liquid, the tire 14 may advantageously include a plurality of paddles 21 extending into the central cavity 18 from a position on th tire 14 furthest from the rim 16. During rotation of the wheels 12, these paddles 21 serve to bring the first fluid 20 up along the outer circumference of the toroidal central cavity 18 permitting it to fall down over the rim 16 as it reaches an elevated position. In certain applications, centrifigal force alone may be sufficient to impart this motion to the first fluid 20 thereby obviating the need for the paddles 21. A paddle arrangement could also be used to divert the first cooling fluid 20 from the outer diameter of the central cavity 18 to the rim 16 during rapid rotation of the wheel 12.

A heat transfer device 22, such as a heat transfer coil, is circumferentially wound around the rim 16 within the central cavity 18. Of course, this heat transfer device 22 need not be a circumferentially wound coil; it could also be a plate type radiator or another type of radiator as would be known to those skilled in the art. This coil 22 has an inlet 24 for receiving a second fluid 25 and an outlet 26 from which the second fluid 25 leaves the coil 22. Alternatively, the heat transfer device 22 can be positioned inside the rim 16 and in heat transferring relation, preferably adjacent, to the central cavity 18.

The outlet 26 of the coil 22 passes to a first rotating wheel seal 28 permitting the first fluid 20 to be transferred from the rotating coil 22 to a non-rotating heat transfer circuit 30. The second fluid 25 is transferred through this circuit 30 from the coil outlet 26, through the rotating wheel seal 28, and to an insulated tank 32.

The heat transfer circuit 30 continues with a pump 34 having an inlet end 36 drawing upon the second fluid 25 contained within the insulated tank 32. This pump 34 forces the second fluid through a heat exchanger 38 and thence to a second rotating wheel seal 40 for supplying the second fluid 25 to the inlet 24 of the rotating coil 22. This heat exchanger 38 is non-rotatively mounted to the vehicle in which this tire cooling system 10 is utilized. That is, the heat exchanger 38 is directly and fixedly mounted to the vehicle and not rotatively mounted to the wheel 12. By mounting the heat exchanger 38 to the vehicle it may be better protected, more efficient, and larger than would be possible were it mounted to the wheel 12.

The rotating wheel seals 28,40 have a sump 42 for collecting leakage which is common with the final drive sump of the vehicle in which the present invention is utilized. The second fluid 25 may be the same as that utilized in the final drive, thereby eliminating contamination and segregation problems.

The heat exchanger 38 may be passive, such as an air cooled radiator (FIG. 1), or active, such as a refrigerated loop heat exchanger (FIG. 2). In the latter case a refrigerated loop 44 passes a third fluid, such as freon, through a compressor 48 to a condensor 50, to a receiver-drier 52, through an expansion valve 54, into the heat exchanger 38, and back to the compressor 48 in a manner well known.

The insulated tank 32, in addition to being supplied with second fluid 25 from the rotating wheel seal 28 may also draw upon second fluid 25 from the sump 42 to make up losses from the rotating wheel seals 28,40. The second fluid 25 may be transferred from the sump 42 to the insulated tank 32 by suction, gravity feed, an additional pump or other means known to those skilled in the art.

The tire cooling system 10 described above included only a single wheel 12. A scheme incorporating additional tires into the circuit would be apparent to those skilled in the art in light of the previous disclosure. FIG. 2, for instance, shows two wheels 12 in series in the heat transfer circuit 30. Further wheels 12 could also be placed in parallel with a common pump to minimize the length of each circuit while still requiring but a single pump 34.

Industrial Applicability

In the operation of the tire cooling system 10, heat is transferred from the tire 14 to the first fluid 20, from the first fluid 20 to the second fluid 25, and from the second fluid 25 to the heat exchanger 38.

More specifically, as heat is generated in the tire 14, it is transferred to the relatively cooler first fluid 20. The first fluid 20 is free to move within the central cavity 18 and will, of course, rest in the bottom of this central cavity 18 when the tire 14 is rotating slowly or not at all. At higher rotational velocities, where the generation of heat is a problem, the combination of the paddles 21 (if utilized) and centrifugal force bring the first fluid 20 to an elevated position from which it can fall over the rim 16 and the heat transfer device 22 which is adjacent the rim 16. As the first fluid 20 contacts the heat transfer device 22, heat is transferred away from the first fluid 20 permitting it to further cool the tire 16. If the heat transfer device 22 is located within the rim 16, heat is transferred from the first fluid 20 to the rim 16, and from the rim 16 to the heat transfer device 22.

The use of final drive oil as the second fluid 25 permits a common sump 42 to be used for containing leakage from the rotating seals 28,40 and the final drive. The second fluid is pumped through the heat transfer circuit 30 to dump the heat it absorbs from the first fluid 20. Losses of fluid 25 through the rotating seals 28,40 may then be made up from the sump 42.

Of course, in light of the above, it is clear that in an alternative embodiment an isolated sump for the rotating seals 28,40 could be utilized, thereby obviating the need for an intermediate heat exchanger, such as the heat transfer coil 22. This would permit a fluid, such as ethylene glycol, which is not injurious to rubber, to be utilized throughout the entire tire cooling system. That is, the central cavity 18 and heat transfer circuit 30 could, without injury to the tires 16, be in fluid communication. Such a scheme would, however, present a problem in that it is difficult to extract a liquid to the exclusion of air from a rotating cavity, such as central cavity 18, which contains a relatively small volume fraction of the liquid and a larger volume fraction of air. Additionally, as previously discussed, leakage from the rotating wheel seals would be pronounced in such a system.

The present invention advantageously solves the need for effective heat removal from a tire, which in certain practical applications, requires an external heat exchanger, while avoiding the need for extracting a liquid from the central cavity of a tire 16. Additionally, this invention utilizes the existing final drive sump of a vehicle, thereby avoiding the need for an additional sump for capturing loss of the cooling fluid through the rotating wheel seals. Further, the rotating wheel seals are operated at a pressure little above ambient, minimizing leakage.

Other aspects, objects, advantages and uses of this invention can be obtained from a study of the drawings, the disclosure, and the appended claims. It should be understood that the tire cooling system can assume many other configurations without departing from the claims.

I claim:

1. In a wheel assembly having a wheel (12) mounted on a vehicle, said wheel (12) having a rim (16), a tire (14) mounted on said rim (16), and a central cavity (18) defined by said tire (14) and rim (16), the improvement comprising:

fluid circuit means (22,28,30,40) for pumping a liquid (25) between said central cavity (18) and a non-rotating heat exchanger (38), said heat exchanger (38) being external to said wheel (12).

2. The wheel assembly, as set forth in claim 1, wherein said fluid circuit means (30) includes a pump (34) and, in fluid communication therewith, a heat transfer device (22) having an inlet portion (24) and an outlet portion (26), said heat transfer device (22) being positioned within said central cavity (18).

3. The wheel assembly, as set forth in claim 2, wherein said central cavity (18) contains another fluid (20).

4. The wheel assembly, as set forth in claim 3, wherein said another fluid (20) is isolated from said liquid (25).

5. The wheel assembly, as set forth in claim 4, including a plurality of rotating wheel seals (28,40) and wherein said inlet and outlet portions (24,26) of said heat transfer device (22) are each connected to a respective rotating wheel seal (28,40).

6. The wheel assembly, as set forth in claim 5, wherein said vehicle has a final drive sump (42).

7. The wheel (12), as set forth in claim 6, wherein said final drive sump (42) is of a construction sufficient for collecting substantially any of said liquid (25) leaking from either of said rotating wheel seals (28,40).

8. A tire cooling system (10) for a vehicle, comprising:

a rim (16);
a tire (14) mounted on said rim (16);
a central cavity (18) defined by said tire (14) and said rim (16), and adapted to receive a first fluid (20);
a heat exchanger (38) non-rotatively mounted to said vehicle;
means (22,28,30,40) for circulating a second fluid (25) from said heat exchanger (38) through said central cavity (18), and maintaining said second fluid (25) free from fluid communication with said first fluid (20).

9. The tire cooling system (10), as set forth in claim 8, wherein said means (22,28,30,40) for circulating includes a heat transfer device (22) positioned within said central cavity (18).

10. The tire cooling system (10), as set forth in claim 9, wherein said heat transfer device (22) is a coil of a construction sufficent for circulating said second fluid (25) therethrough.

11. The tire cooling system (10) as set forth in claim 9, wherein said heat transfer device (22) is a plate-type heat exchanger of a construction sufficient for circulating said second fluid (25) therethrough.

12. The tire cooling system (10), as set forth in claim 10, wherein said coil (22) is substantially concentric with said rim (16).

13. The tire cooling system (10), as set forth in claim 9, wherein said means (22,28,30,40) for circulating includes means (28,40) for transferring said second fluid (25) from said heat exchanger (38) through said wheel mounted heat transfer device (22) and back to said heat exchanger (38).

14. The tire cooling system (10), as set forth in claim 13, wherein said means (28,40) for transferring includes at least one rotating wheel seal (28).

15. The tire cooling system (10), as set forth in claim 14, including a sump (42) adapted to receiving fluid leaking from said rotating wheel seal (28).

16. The tire cooling system (10), as set forth in claim 14, wherein said sump is a final drive sump (42).

17. The tire cooling system (10), as set forth in claim 16, wherein said final drive sump (42) is of a construction sufficient for receiving fluid leaking from said rotating wheel seals (28).

18. The tire cooling system (10), as set forth in claim 15, wherein said means (22,28,30,40) for circulating includes a pump (34) and means for obtaining said second fluid (25) from said sump (42).

19. The tire cooling system (10), as set forth in claim 8, wherein said first fluid (20) is a liquid.

20. The tire cooling system (10), as set forth in claim 19, wherein said tire (14) includes paddle means (21) for bringing said first fluid (20) in contact with said heat transfer device (22) in response to rotation of said tire (14).

21. The tire cooling system (10), as set forth in claim 8, wherein said heat exchanger (38) is an active heat exchanger.

22. The tire cooling system (10), as set forth in claim 8, wherein said heat exchanger (38) is an air-cooled radiator.

23. A tire cooling system (10) for a vehicle having wheels (12), said system (10) comprising:

a rim (16);
a tire (14) mounted on said rim (16);
a heat exchanger (38) mounted on said vehicle and being free from being rotatively connected to any of said wheels (12);
a heat transfer device (22) mounted in adjacent, heat transferring relation to said rim (16);
means (30) for circulating a fluid (25) between said heat exchanger (38) and said heat transfer device (22).

24. The tire cooling system (10), as set forth in claim 23, wherein said heat transfer device (22) has an inlet end and an outlet end (24,26), said inlet end being connected to a rotating wheel seal (28).

25. The tire cooling system (10), as set forth in claim 24, wherein said vehicle includes a final drive sump (42), said final drive sump (42) being of a construction sufficient for collecting fluid (25) leakage from said rotating wheel seal (28).

26. A method for cooling a tire of a work vehicle, said vehicle having a non-rotating body portion and a wheel (12), said wheel (12) having a tire (16) mounted on a rim (14) amd a central cavity (18) defined by said tire (16) and rim (14), the method of cooling the wheel (12) comprising the steps of:

circulating a cooling fluid (25) through said central cavity (18);
maintaining said cooling fluid (25) in fluid isolation from said tire (16);
transferring said cooling fluid (25) from said wheel (12) to said non-rotating body portion of said vehicle; and
removing heat from said cooling fluid (25) at said non-rotating body portion of said vehicle.

* * * * *